United States Patent
Dhawan et al.

(10) Patent No.: US 9,794,413 B2
(45) Date of Patent: Oct. 17, 2017

(54) FACILITATION OF A CONFERENCE CALL BETWEEN STATIC AND ROTATING PARTICIPANTS

(71) Applicant: Avaya Inc., Basking Ridge, NJ (US)

(72) Inventors: Salil Dhawan, Pune (IN); Prithviraj Singh, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 40 days.

(21) Appl. No.: 14/724,241

(22) Filed: May 28, 2015

(65) Prior Publication Data

US 2016/0352912 A1 Dec. 1, 2016

(51) Int. Cl.
*H04W 4/08* (2009.01)
*H04M 3/56* (2006.01)
*H04W 4/06* (2009.01)

(52) U.S. Cl.
CPC .......... *H04M 3/566* (2013.01); *H04M 3/563* (2013.01); *H04W 4/08* (2013.01); *H04M 2201/14* (2013.01)

(58) Field of Classification Search
CPC ...... H04M 3/566; H04M 3/563; H04M 3/565; H04W 4/16
USPC ........... 455/416; 379/202.01, 93.21; 370/260
See application file for complete search history.

(56) References Cited

U.S. PATENT DOCUMENTS

| | | | |
|---|---|---|---|
| 2005/0069852 A1* | 3/2005 | Janakiraman | H04M 1/2474 434/236 |
| 2009/0028316 A1* | 1/2009 | Jaiswal | H04M 3/566 379/202.01 |
| 2013/0108034 A1* | 5/2013 | Colbert | H04M 3/566 379/202.01 |
| 2014/0105407 A1* | 4/2014 | Herger | H04M 9/08 381/57 |
| 2014/0173491 A1* | 6/2014 | Kawakubo | G06Q 10/06 715/772 |
| 2015/0052455 A1* | 2/2015 | Boustead | G06F 3/0484 715/753 |
| 2015/0200978 A1* | 7/2015 | Putterman | H04L 51/043 709/204 |
| 2015/0381817 A1* | 12/2015 | Zhao | H04L 12/18 379/202.01 |
| 2016/0164813 A1* | 6/2016 | Anderson | H04L 51/046 709/206 |
| 2017/0104959 A1* | 4/2017 | Bracken | H04N 7/147 |

* cited by examiner

*Primary Examiner* — Inder Mehra

(57) ABSTRACT

Embodiments disclosed herein provide systems, methods, and computer readable media for facilitating a conference call with rotating participants. In a particular embodiment, a method provides identifying one or more static participants for the conference call and identifying at least two rotating participants for the conference call. The method further provides determining an order in which the rotating participants will be connected to the conference call. The method then provides connecting the conference call with the one or more static participants and connecting and disconnecting the conference call with each of the rotating participants in accordance with the order.

20 Claims, 6 Drawing Sheets

| PARTICIPANT SCHEDULE 600 | | |
|---|---|---|
| ORDER | PARTICIPANT | EST. TIME |
| 1 | 405, 407 | 1:00 |
| 2 | 404 | 1:20 |
| 3 | 408 | 1:30 |
| 4 | 406 | 1:40 |
| 5 | 404, 407 | 1:55 |

Figure 6

FACILITATION OF A CONFERENCE CALL BETWEEN STATIC AND ROTATING PARTICIPANTS

TECHNICAL FIELD

Aspects of the disclosure are related to conference calling between remote participants and, in particular, to facilitating a call where not all participants can be or need to be on the call at once.

TECHNICAL BACKGROUND

Conference calling allows two or more parties to collaborate without having to be at the same location. At first, conference calls were limited to voice communications but they have since evolved to handle real-time video communications and presentation materials, among other features, that improve the ability for parties to communicate remotely from one another. A conferencing system is typically used to facilitate the distribution of communications between parties on a conference call.

In some cases, a conferencing system may be limited in the number of connections that are able to be on a conference call at any one time. Such limitations may be caused by physical hardware limitations, such as limitations on the number of connections a communication interface is able to receive or on the number of connections a processing system is able to process. Alternatively, the conferencing system may be provided as part of a service and a service agreement may limit the number of connections that are allowed at a time for a conference call.

In addition to the above limitations that may burden a conferencing system, the subject matter of a meeting may not require all meeting participants to be on a conference call at the same time. In some cases, it may even be preferred or required, for a business purpose or otherwise, that not all meeting participants be on a call at the same time (e.g. during employee performance reviews). Regardless of the reason for not having all meeting participants on a call at one time, coordinating remote participants to connect to a call at desired times using current means can be a difficult endeavor.

OVERVIEW

Embodiments disclosed herein provide systems, methods, and computer readable media for facilitating a conference call with rotating participants. In a particular embodiment, a method provides identifying one or more static participants for the conference call and identifying at least two rotating participants for the conference call. The method further provides determining an order in which the rotating participants will be connected to the conference call. The method then provides connecting the conference call with the one or more static participants and connecting and disconnecting the conference call with each of the rotating participants in accordance with the order.

In some embodiments, the method further provides, based on a start time for the conference call, using the order to determine a call time for each of the rotating participants and transferring a calendar invitation for the conference call to each of the rotating participants, wherein each calendar invitation indicates the call time for each respective rotating participant.

In some embodiments, upon determining that the conference call is running at a different pace than is indicated by the calendar invitations, the method provides transferring a notification of the different pace to the rotating participants that have not yet connected to the conference call.

In some embodiments, determining the order comprises identifying a threshold number of concurrent call connections allowed for the conference call and determining the order based on the threshold number of concurrent call connections. The number of concurrent call connections on the conference call at any time during the conference call cannot exceed the threshold number of concurrent call connections.

In some embodiments, determining the order comprises determining a topic that each rotating participant will be discussing on the conference call and determining the order based on each of the topics.

In some embodiments, the method further provides ranking the topics based on importance and scheduling rotating participants discussing more important topics earlier in the conference call than rotating participants discussing less important topics.

In some embodiments, determining the order comprises determining which of the rotating participants should not be connected to the conference call at the same time and determining the order based on the rotating participants that should not be connected to the conference call at the same time.

In some embodiments, the order further defines when a rotating participant should be speaking when connected to the call, and the method further comprises, when more than one of the rotating participants are connected to the conference call at the same time, selectively muting and unmuting the rotating participants based on the order.

In some embodiments, the method further includes providing the one or more static participants with a user interface option that, when activated by a static participant, overrides the selectively muting and unmuting.

In some embodiments, the method provides, during the conference call, updating the order based on factors identified as the conference call progresses.

In another embodiment, a conference system including a processing system and a communication interface is provided. The processing system is configured to identify one or more static participants for the conference call, identify at least two rotating participants for the conference call, and determine an order in which the rotating participants will be connected to the conference call. The communication interface is configured to connect the conference call with the one or more static participants and connect and disconnect the conference call with each of the rotating participants in accordance with the order.

In yet another embodiment, a computer readable storage medium having instructions stored thereon for operating a conference system is provided. The instructions, when executed by the conference system, direct the conference system to identify one or more static participants for the conference call and identify at least two rotating participants for the conference call. The instructions further direct the conferencing system to determine an order in which the rotating participants will be connected to the conference call. The instructions also direct the processing system to connect the conference call with the one or more static participants and connect and disconnect the conference call with each of the rotating participants in accordance with the order.

BRIEF DESCRIPTION OF THE DRAWINGS

Many aspects of the disclosure can be better understood with reference to the following drawings. While several

FIG. 6 illustrates an example schedule for rotating participants in an operational scenario.

TECHNICAL DISCLOSURE

Conference calls allow for meetings to take place between participants located remotely from one another. A conference call may consist of purely audio communications between participants but may also include video communications between at least a portion of the participants, presentation materials (e.g. slides), or any other type of information that may be used during a meeting. These features allow for remotely located meeting participants to replicate and, in some cases, improve upon the effectiveness of a meeting between participants at the same location.

In the case of some meetings, whether in person or over a conference call, not every participant need be in the meeting at any one given time. For example, in a meeting for a supervisor to receive progress reports from an employee in each department, the supervisor does necessarily need, or may not even want, all of the employees on the call at one time. Rather, one employee can report progress in the meeting and then leave the meeting for another employee to join to report progress. Scenarios such as this are made even more complex when using a conference call in place of an in person meeting. The complexities are due to subsequent employees on the call having to manually be told to join the conference call (e.g. sending the next employee an email asking them to dial in). Moreover, in many cases, a conferencing system handling the conference call may have limitations to the number of participants that can be on a conference call at any one time. These limitations may be physical limitations of the conferencing system itself, limitations on a subscriber agreement to the conferencing system, or some other type of limitation. Thus, the conferencing systems described below are capable of automatically rotating participants into and out of a conference call.

Figure 1:
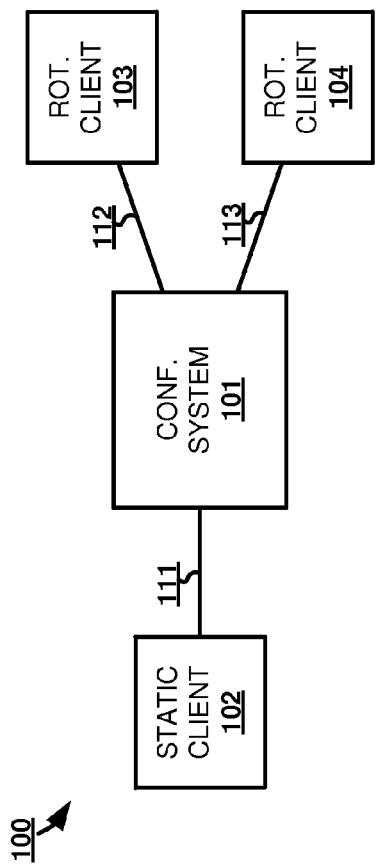
FIG. 1 illustrates a conference call environment for facilitating a conference call with rotating participants.

FIG. 1 illustrates conference call environment 100 in an operational scenario of facilitating a conference call with rotating participants. Conference call environment 100 includes conferencing system 101, static client 102, and rotating clients 103-104. Clients 102-104 and conferencing system 101 communicate over communication links 111-113, respectively.

Static client 102 is a client, such as a computer, phone, tablet, or other type of communication device, that is operated by one or more static participants. For the purposes of this embodiment, a static participant is a participant on a conference call that does not rotate on or off of the call (or at least is not scheduled to rotate on and off of the call). For example, a meeting host may be a static participant that remains on a conference call for the duration of the call. Alternatively, rotating clients 103-104, which each also may be a computer, phone, tablet, or other type of communication device, are each operated by one or more rotating participants. In this embodiment, a rotating participant is a participant that connects to and disconnects from a conference call during the call and is therefore not intended to be on the conference call for the entire duration.

Figure 2:
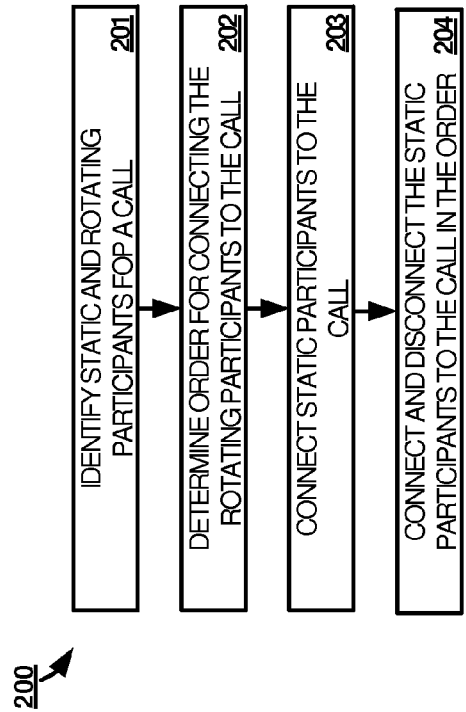
FIG. 2 illustrates a method of operating the conference call environment to facilitate a conference call with rotating participants.

FIG. 2 illustrates a method 200 for operating conference call environment 100 in an example scenario of facilitating rotating participants on a conference call. Method 200 provides conferencing system 101 identifying one or more static participants for a conference call and identifying at least two rotating participants for the conference call (step 201). Each of the participants may be identified from user input (e.g. from a static participant) indicating each of the participants. The input may further include contact information (e.g. phone number, email address, network handle, etc.) for connecting to a client of clients 102-104 associated with each participant. In some examples, the participant's contact information alone may be used to designate the participant. The user input may be received into one of clients 102-104 and information indicating that input may be transferred to conferencing system 101 for use when establishing a conference. In further examples, conferencing system 101 may receive indication about topics to be discussed during the conference call and then automatically populate participants and their contact information. Alternative, ways for identifying participants may also be used.

Once the participants have been identified, method 200 provides conferencing system 101 determining an order in which the rotating participants will be connected to the conference call (step 202). In this example, rotating participants for only two rotating clients 103-104 need to be ordered such that only one of rotating clients 103-104 is connected to the call at any given time. This may be due to physical limitations of conferencing system 101 allowing only two clients to be connected to a conference call at one time or may be due to other factors, such as user designated preferences for the call.

When the conference call is to begin, method 200 provides conferencing system 101 connecting the conference call with the one or more static participants (step 203). In this case, the one or more static participants are only operating static client 102. The conference call itself may be a traditional voice (audio) call or may include real-time video communications, presentation materials, or other conference information. Method 200 also provides conferencing system 101 connecting and disconnecting the conference call with each of the rotating participants in accordance with the order (step 204). A rotating client of rotating clients 103-104 than corresponds to the first rotating participant in the order may be connected to the conference call at substantially the same time as the static participants. When the first client connected to the call disconnects itself or is disconnected by conferencing system 101, then the other rotating client, which is next in the order, is connected to the call. For example, if rotating client 103 is first connected to the call, conferencing system 101 will connect to rotating client 104 upon rotating client 103 being disconnected from the call. In some examples, rotating client 103 may be reconnected to the call later on after rotating client 104 disconnects.

It should be understood that any one participant may operate more than one client capable of joined a conference call (e.g. a participant may use a smartphone, a tablet, and a laptop that are all capable of connecting in some way to conferencing system 101). Therefore, the clients described herein are the clients that the participant uses to communicate during the conference call. Hence, when attempting to connect a participant to a call, conferencing system 101 may reach out to multiple clients of the participant and connect to whichever client the participant directs to respond to conferencing system 101.

Figure 3:
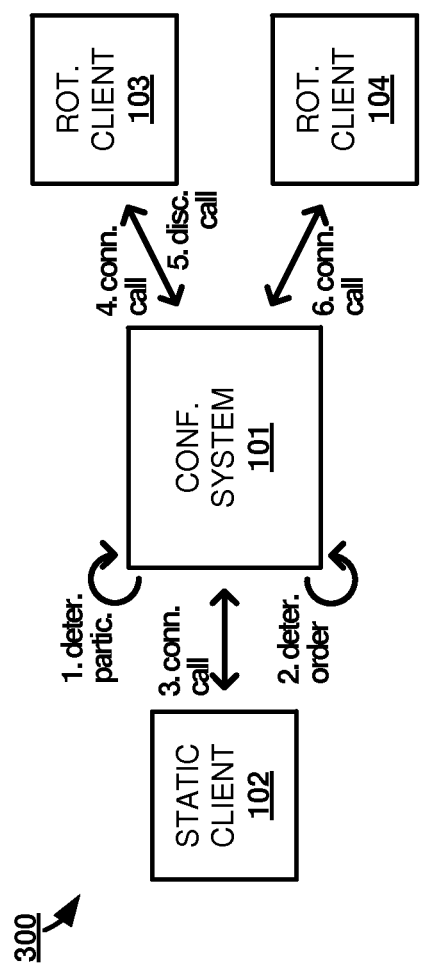
FIG. 3 illustrates an operation of the conference call environment to facilitate a conference call with rotating participants.

FIG. 3 illustrates operation 300 in an example scenario of facilitating rotating participants on a conference call. At step 1 conferencing system 101 determines the participants, static and rotating, that will be on the conference call. The participants may be identified based on user input into one of clients 102-104. In particular, the participants may be identified within parameters for the conference call as a whole (e.g. start time, end time, topics to be discussed, materials to be presented, etc.). At step 2, conferencing system 101 determines the order in which rotating participants should be connected to the call. The order may be provided when the rotating participants are identified, may be random, or may be based on factors related to the rotating participants themselves and the topics they will be discussing. For example, more important topics may need to be discussed first and the rotating participants discussing those topics may be ordered before participants discussing less important topics.

At step 3, conferencing system 101 connects the call to static client 102 operated by the static participant(s). The call may be connected to static client 102 by dialing out to a phone number of static client 102, signaling a network handle (e.g. username) associated with static client 102, or by any other way in which a communication can be initiated to a client depending on the communication mode in use (e.g. traditional telephone networks, packet based calling, dedicated client software on client devices 102-104, or otherwise). Likewise, the order in this example indicates that the rotating participant(s) at rotating client 103 should be connected to the call first and conferencing system 101 connects the conference call to rotating client 103 accordingly at step 4. Step 4 may occur at substantially the same time as step 3. The call connection to rotating client 103 may be connected to rotating client 103 in the same manner in which the call was connected to static client 102 or may be connected in a different manner (e.g. telephone number, network handle, or otherwise). Alternatively, since static client 102 and rotating client 103 are the first clients connected to the call, either or both of clients 102-103 may instead contact conferencing system 101 for conferencing system 101 to connect them to the conference call.

At step 5, the conference call is disconnected with rotating client 103. Conferencing system 101 may disconnect the call on its own accord (e.g. upon determining that the rotating participant at client 103 should be disconnected), conferencing system 101 may receive an instruction from static client 102 to disconnect rotating client 103 (e.g. based on user input from a static participant at client 102), or conferencing system 101 may disconnect rotating client 103 upon detecting a connection loss with rotating client 103 (e.g. a rotating participant at client 103 instructed client 103 to disconnect from the call). After rotating client 103 is disconnected, rotating client 104 is connected to the conference call at step 6 in accordance with the order. The call connection to rotating client 104 may be connected to rotating client 104 in the same manner in which the call was connected to clients 102-103 or may be connected in a different manner.

Advantageously, the static participant(s) at static client 102 is able to first communicate with the rotating participant(s) at static client 103 before the rotating participant(s) at rotating client 104 are connected to the call.

Referring back to FIG. 1, conferencing system 101 comprises a computer processor system and communication interface. Conferencing system 101 may also include other components such as a router, server, data storage system, and power supply. Conferencing system 101 may reside in a single device or may be distributed across multiple devices. While shown separately, the functionality of conferencing system 101 may be incorporated into one of clients 102-104. Conferencing system 101 may be call routing equipment, a communication server, application server, personal computer workstation, network gateway system, or some other computing system—including combinations thereof.

Clients 102-104 each comprise a computer processor system and communication interface. Clients 102-104 may also include other components such as a router, server, data storage system, and power supply. Clients 102-104 may each reside in a single device or may be distributed across multiple devices. Clients 102-104 may each be a telephone, computer, tablet, conference room system, e-book, mobile Internet appliance, network interface card, media player, game console, application server, proxy server, or some other communication apparatus—including combinations thereof.

Communication links 111-113 use metal, glass, air, space, or some other material as the transport media. Communication links 111-113 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 111-113 could be direct links or may include intermediate networks, systems, or devices.

Figure 4:
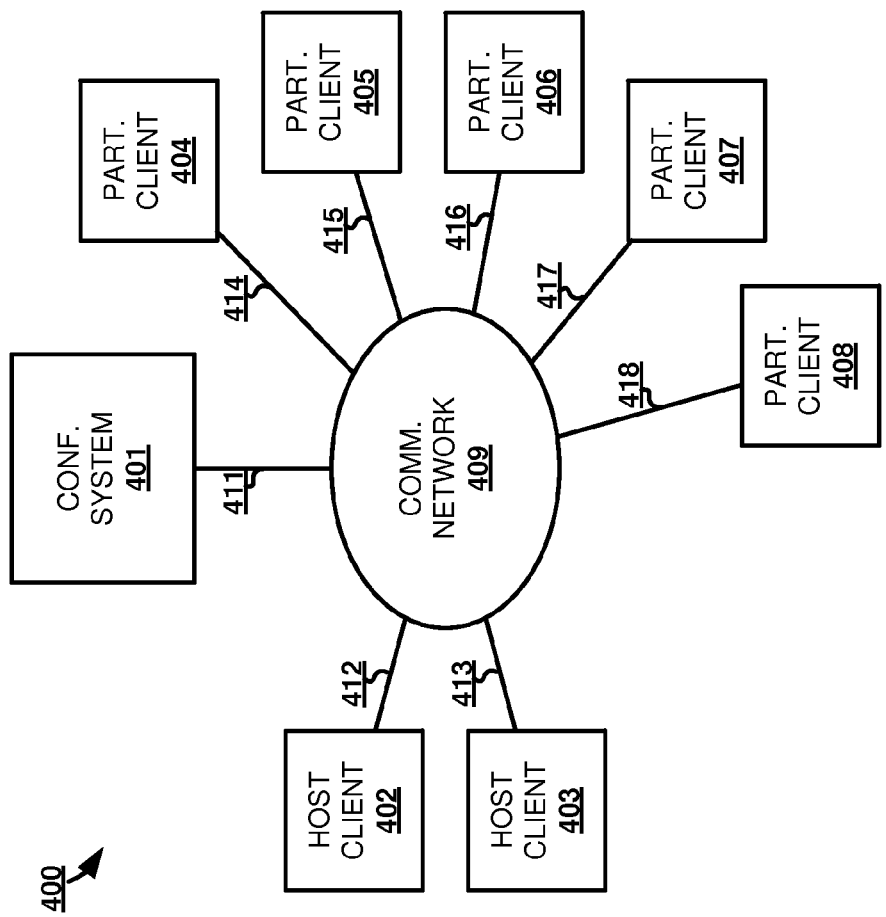
FIG. 4 illustrates another conference call environment for facilitating a conference call with rotating participants.

FIG. 4 illustrates conference call environment 400 in an operational scenario of facilitating a conference call with rotating participants. Conference call environment 400 includes conferencing system 401, host clients 402 and 403, rotating clients 404-408, and communication network 409. Communication links 411-418 connect conferencing system 401 and clients 402-408 to communication network 409. Communication network 409 comprises network elements that provide communications services. Communication network 409 may comprise switches, wireless access nodes, Internet routers, network gateways, application servers, computer systems, communication links, or some other type of communication equipment—including combinations thereof. While illustrated as one network, communication network 409 may include multiple networks and network types, such as local area networks and the Internet.

Figure 5:
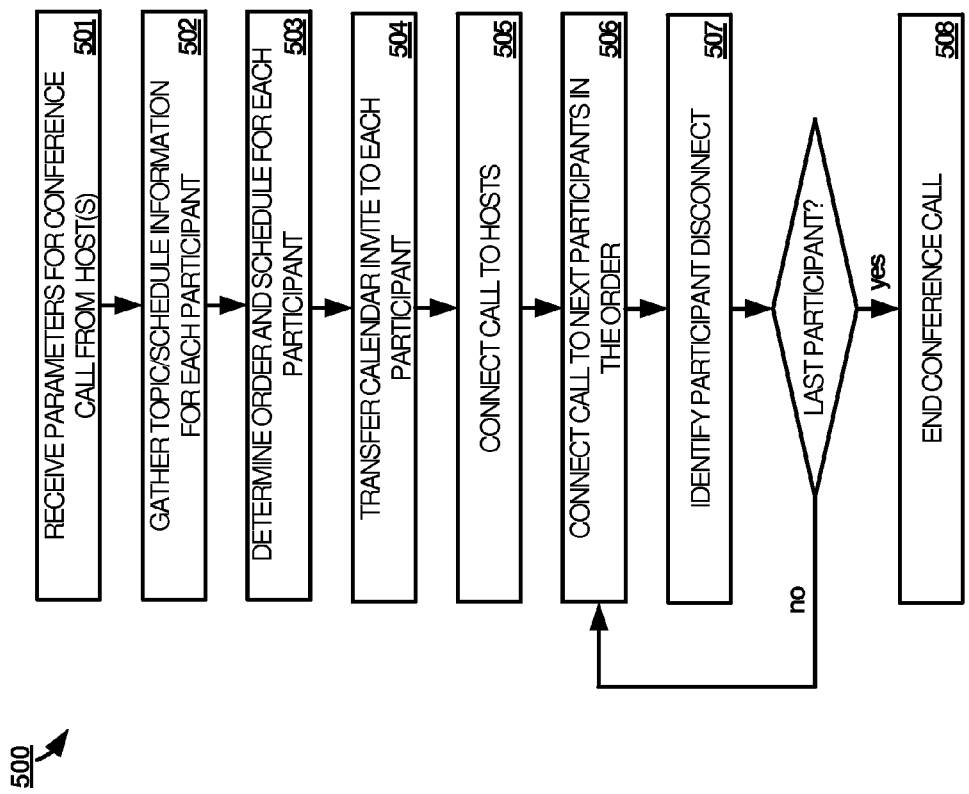
FIG. 5 illustrates a method of operating the conference call environment to facilitate a conference call with rotating participants.

FIG. 5 illustrates an operation 500 for operating conference call environment 400 in an example scenario of facilitating rotating participants on a conference call. In this example, it is assumed that each client has only one operating participant, although, other examples may include multiple participants at any one client (e.g. multiple participants in a single room with one client device capturing all participants in the room). Operation 500 begins when one or more the host participants operating host clients 402 and 403 define parameters for a conference call and those parameters are received by conferencing system 401 (step 501). The parameters may be entered by the host participants in the same manner as a traditional conference call would be scheduled in a conventional conference calling system. For example, the parameters may define participants for the call (e.g. by entering email addresses or some other identifier for each participant), a start time for the call, an end time for the call if any, or any other parameter that may be used during a conventional conference call.

In addition to the more typical parameters for the conference call described above, the parameters include information relevant to participants rotating onto and off of the conference call. The parameters from the host participant(s) further define which participants are going to rotate on and off of the call. The parameters in this example define the host participants operating clients 402-403 as being static participants on the conference call. Hence, while the host participants may still join or drop from the call at their leisure, they are not scheduled to connect in any particular order or at any particular time, as do rotating participants. Additionally, the parameters define the participants operating clients 404-408 as rotating participants that will need to be scheduled for joining the call.

Conferencing system 401 gathers information regarding topics that each rotating participant will discuss and schedule information for those participants (step 502). Any of this information may be included in the parameters provided by the host participant(s). For example, the host participants may provide documentation that each participant will be presenting from which each participant's topic may be determined. Likewise, the host participants may explicitly provide topic and/or schedule information for the participants. Alternatively, conferencing system 401 may automatically gather information from one or more sources, such as calendars for each participant, work product repositories, document repositories, project information repositories, or some other source that includes information relevant to either a topic to be discussed on the conference call or the participants schedule.

Once topic and schedule information has been gathered, conferencing system 401 determines order and schedule for each rotating participants (step 503). The order indicates which rotating participants should be connected to the conference call before other rotating participants. In some cases, the rotating participants may be connected to the call one at a time while, in other cases, the order may allow for more than one rotating participant to be connected to the call at once. The order may be prioritized in some manner either defined by a host participant or automatically by conferencing system 401. In one example, the importance of the topics to be discussed may be ranked by conferencing system 401, possibly based on input from a host participant, and rotating participants presenting the most important topics are ordered before participants presenting less important topics. For example, employees working on projects having the most bugs to report may be rotating participants that are ordered earlier in the call than other rotating participants. Alternatively, the most important rotating participants may ordered towards the end of the call to allow less important topics to be discussed and dispensed of early on in the call.

Additionally, a schedule of the rotating participants is created such that each rotating participant can be notified of about when they will be connected to the conference call. In some cases, scheduling may override other aspects of the ordering of rotating participants. For example, even if a rotating participant will be discussing a topic that ranked most important, if that rotating participant has a scheduling conflict at the beginning of the conference call (based on the schedule information gathered in step 502), then the rotating participant may instead be ordered and scheduled later in the call when they are available. Furthermore, when determining the schedule, conferencing system 401 may estimate or receive input from one of the host participants, indicating how long each topic discussion may take. Thus, the time in which a rotating participant will likely be connected to the conference call can be predicted.

Once the schedule is determined, a calendar invite is transferred to each participant client 404-408 indicating when each client's rotating participant is scheduled to join the conference call (step 504). The calendar invite may be an invite recognized by a calendar application executing on client devices 404-408 or may be an invite recognized by an application executing on client devices 404-408 that facilitates conference call communications with conferencing system 401. Thus, the calendar invite is to inform each rotating participant as to about what time they will be connected to the conference call. The calendar invite may further indicate each rotating participant's topic of discussion, documentation related to the conference call, or some other information relevant to the rotating participant's participation in the conference call.

When the start time of the conference call arrives, conferencing system 401 connects the conference call to the host participants by connecting the conference call to host participant clients 402 and 403 (step 505). Host clients 402 and 403 may contact (e.g. dial out or otherwise initiate communications) conferencing system 401 for system 401 to connect them to the call or conferencing system 401 may contact host clients 402 and 403. Which method is used may depend upon participant preferences or the configuration of conferencing system 401.

Likewise, conferencing system 401 also connects the clients of the next participants in the order, which in this case is the first participants listed in the order since the conference call is just beginning (step 506). The clients for these first rotating participants may be contacted by conferencing system 401 to connect the call or the clients may be directed to contact conferencing system 401 for system 401 to connect the call. In one example, the calendar invite transferred at step 504 includes instructions for each client 404-408 to contact conferencing system 401 at the indicated time. Once host participants and rotating participants are connected to the conference call, the participants can communicate with each other using the conferencing features of conferencing system 401, such as exchanging real-time audio and/or video communications between participants, presenting presentation media (e.g. slides, animations, etc.), or some other type of information that may be relevant to conference participants.

Conferencing system 401 then identifies that the rotating participant(s) connected to the conference call are now disconnected (step 507). Conferencing system 401 may have itself disconnected communications with participant clients operated by the rotating participants or the participant clients may have disconnected communications, possibly at the instruction of the rotating participant. When communications with the participant clients have been severed, conferencing system 401 disconnects them from the call.

At this point, conferencing system 401 references the order to determine whether additional rotating participants should be connected to the conference call. If the last rotating participants in the order have left the call, then conferencing system ends the conference call (step 508). In some cases, the conference call will remain active until the host participants leave the call, which may allow conversation between host participants without any rotating participants on the call. Alternatively, if more rotating participants remain in the order, then operation 500 returns to step 506 and connects the conference call to the next rotating participant clients listed in the order. Steps 506 and 507 therefore repeat until all scheduled rotating participants have been cycled through on the conference call.

At any point during operation 500, a host participant may be able to override decisions of conferencing system 401 via the host participant's user interface on host client 402 or 403. For example, the host participant may prefer a different order of rotating participants. The host participant may therefore direct conferencing system 401 to change the order in accordance with the host's wishes. Similarly, the order/scheduling of the rotating participants may be dynamic throughout the conference call based on factors that may arise during the call. For example, if certain participants stay on the call longer than initially planned, then subsequent participants may be reordered or rescheduled to account for the longer call time. Moreover, conferencing system 401 may transfer update calendar invites or some other notification (i.e. email, text message, etc.) that updates the effected rotating participants to the schedule change.

Additionally, if more than one rotating participant is connected to the conference call at one time, then conferencing system 401 may selectively mute or unmute those participants based on when it is time for them to speak. For example, a rotating participant may be brought on to the call before it is that participant's time to speak and conferencing system 401 may mute that participant until it is time for that participant to speak. Host clients 402 and 403 may provide their respective host participants with the ability to selectively override the muting or unmuting of any given rotating participant (e.g. a user interface element that the host participant may activate to do so).

FIG. 6 illustrates an example participant schedule 600 in an operational scenario. For the purposes of this example, conferencing system 401 is limited to only four conference participants being on a conference call at any one time. Two of those participants are the two hosts operating host clients 402-403. Thus, when generating schedule 600, conferencing system 401 may only schedule two additional rotating participants to be on the conference call at any given time.

Schedule 600 includes the participant order positions 1-5, the participants at each position as identified by client number, and the estimated time in which that participant will be connected to the call. In this example, the conference call is scheduled to begin at one o'clock and the first rotating participants 405 and 407 are therefore scheduled to connect to the call at that estimated start time. Each rotating participant receives a calendar invite from conferencing system 401 through their respective client 404-408 in accordance with the schedule. Thus, clients 405-407 receive an invite indicating a 1:00 call time (which in this case coincides with the 1:00 conference call start time) with a duration of 20 minutes, client 404 receives an invite indicating a 1:20 call time with a duration of 10 minutes, client 408 receives an invite indicating a 1:30 call time with a duration of 10 minutes, and client 406 receives an invite indicating a 1:40 call time with a duration of 15 minutes. Additionally, in this example, schedule 600 indicates that rotating participants operating clients 404 and 407 should be on the call again. Therefore, clients 404 and 407 receive additional invites indicating a 1:55 call time and, in this case, the duration of the call is open ended. Alternatively, the initial invite sent to clients 404 and 407 may indicate the 1:55 call time in addition to each participant's earlier scheduled time.

Conferencing system 401 then uses schedule 600 to determine when it should connect each of clients 404-408 to the conference call. In some examples, both of clients 405 and 407 may need to disconnect from the call before client 404 is connected to the call while, in other examples, only one of clients 405 and 407 need disconnect from the call before client 404 is connected to the call. Additionally, each subsequent client may be connected to the call regardless of the call time estimated in schedule 600. However, if a previously ordered client is disconnected from the call before the next client is scheduled to connect, then alternative examples may provide that conferencing system 401 waits until the estimated start time to connect the subsequent client to the call. For example, if client 404 is disconnected from the call before 1:30, then conferencing system 401 may be configured to wait until 1:30 to connect client 408 to the call. Alternatively, based on how the call is progressing (e.g. running long or short), conferencing system 401 may transfer updates to clients that are still due to be connected to the call so that the rotating participants at those clients are informed about when they will end up being on the call. These update notifications may be transferred in the form of an updated calendar update, an email message, a text message, or some other form of communicating such information. For example, if the call is running long with client 408, a notification may be sent to client 406, who is after client 408 in the order, indicating a later estimated call time for connection to the call. A similar notification may be sent to clients 404 and 407 who come after client 406 in the order.

Figure 7:
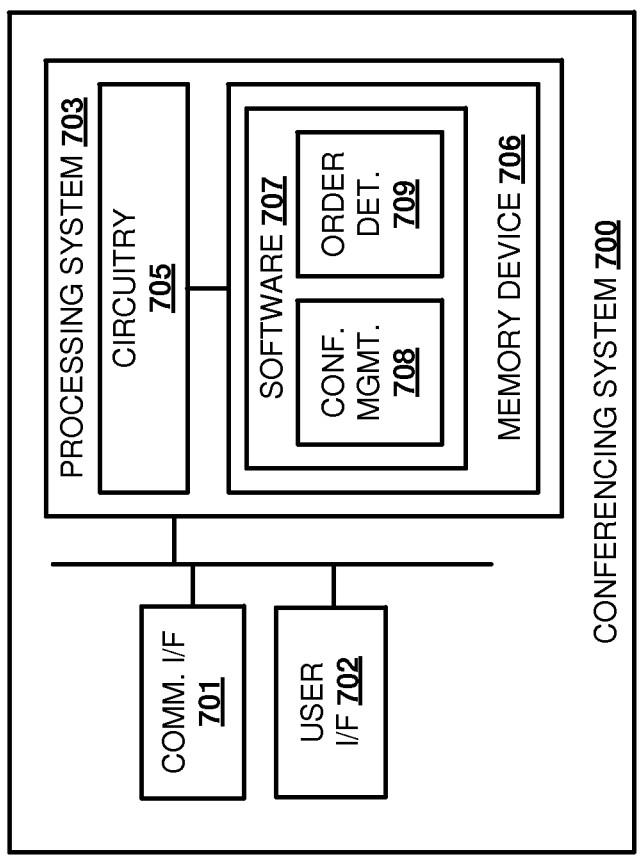
FIG. 7 illustrates a conferencing system for facilitating a conference call with rotating participants.

FIG. 7 illustrates conferencing system 700. Conferencing system 700 is an example of conferencing system 101, although system 101 could use alternative configurations. Conferencing system 700 comprises wireless communication interface 701, user interface 702, and processing system 703. Processing system 703 is linked to wireless communication interface 701 and user interface 702. Processing system 703 includes processing circuitry 705 and memory device 706 that stores operating software 707. Conferencing system 700 may include other well-known components such as a battery and enclosure that are not shown for clarity. Conferencing system 700 may be an application server, proxy server, telephone, tablet, computer, e-book, mobile Internet appliance, media player, game console, or some other communication apparatus—including combinations thereof.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Processing circuitry 705 is typically mounted on a circuit board that may also hold memory device 706 and portions of communication interface 701 and user interface 702. Operating software 707 comprises computer programs, firmware, or some other form of machine-readable processing instructions. Operating software 707 includes conference management module 708 and order determination module 709. Operating software 707 may further include an operating system, utilities, drivers, network interfaces, applications, or some other type of software. When executed by processing circuitry 705, operating software 707 directs processing system 703 to operate conferencing system 700 as described herein.

In particular, conference management module 708 directs processing system 703 to identify one or more static participants for the conference call and identify at least two rotating participants for the conference call. Order determination module 709 directs processing system 703 to determine an order in which the rotating participants will be connected to the conference call. Conference management module 708 further directs processing system 703 to connect the conference call with the one or more static participants and to connect and disconnecting the conference call with each of the rotating participants in accordance with the order.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of facilitating a conference call with rotating participants, the method comprising:
    identifying one or more static participants for the conference call;
    identifying at least two rotating participants for the conference call;
    determining an order in which the rotating participants will be connected to the conference call;
    in a conferencing system, connecting the conference call to one or more static clients operated by the one or more static participants; and
    in the conferencing system, connecting and disconnecting the conference call to each of one or more rotating clients, operated by the rotating participants, in accordance with the order.

2. The method of claim 1, further comprising:
    based on a start time for the conference call, using the order to determine a call time for each of the rotating participants; and
    transferring a calendar invitation for the conference call to each of the rotating participants, wherein each calendar invitation indicates the call time for each respective rotating participant.

3. The method of claim 2, further comprising:
    upon determining that the conference call is running at a different pace than is indicated by the calendar invitations, transferring a notification of the different pace to the rotating participants that have not yet connected to the conference call.

4. The method of claim 1, wherein determining the order comprises:
    identifying a threshold number of concurrent call connections allowed for the conference call; and
    determining the order based on the threshold number of concurrent call connections, wherein the number of concurrent call connections on the conference call at any time during the conference call cannot exceed the threshold number of concurrent call connections.

5. The method of claim 1, wherein determining the order comprises:
    determining a topic that each rotating participant will be discussing on the conference call; and
    determining the order based on each of the topics.

6. The method of claim 5, further comprising:
    ranking the topics based on importance; and
    scheduling rotating participants discussing more important topics earlier in the conference call than rotating participants discussing less important topics.

7. The method of claim 1, wherein determining the order comprises:
    determining which of the rotating participants should not be connected to the conference call at the same time; and
    determining the order based on the rotating participants that should not be connected to the conference call at the same time.

8. The method of claim 7, further comprising:
    providing the one or more static participants with a user interface option that, when activated by a static participant, overrides the selectively muting and unmuting.

9. The method of claim 1, wherein the order further defines when a rotating participant should be speaking when connected to the call, and the method further comprising:
    when more than one of the rotating participants are connected to the conference call at the same time, selectively muting and unmuting the rotating participants based on the order.

10. The method of claim 1, further comprising:
    during the conference call, updating the order based on factors identified as the conference call progresses.

11. A conference system for facilitating a conference call with rotating participants, the conference system comprising:
    a processing system configured to identify one or more static participants for the conference call, identify at least two rotating participants for the conference call, and determine an order in which the rotating participants will be connected to the conference call; and
    a communication interface configured to connect the conference call to one or more static clients operated by the one or more static participants and connect and disconnect the conference call to each of one or more rotating clients, operated by the rotating participants, in accordance with the order.

12. The conference system of claim 11, further comprising:
    the processing system configured to, based on a start time for the conference call, use the order to determine a call time for each of the rotating participants; and the communication interface configured to transfer a calendar invitation for the conference call to each of the rotating participants, wherein each calendar invitation indicates the call time for each respective rotating participant.

13. The conference system of claim 12, further comprising:

upon the processing system determining that the conference call is running at a different pace than is indicated by the calendar invitations, the communication interface configured to transfer a notification of the different pace to the rotating participants that have not yet connected to the conference call.

14. The conference system of claim 11, wherein the processing system configured to determine the order comprises:

the processing system configured to identify a threshold number of concurrent call connections allowed for the conference call and determine the order based on the threshold number of concurrent call connections, wherein the number of concurrent call connections on the conference call at any time during the conference call cannot exceed the threshold number of concurrent call connections.

15. The conference system of claim 11, wherein the processing system configured to determine the order comprises:

the processing system configured to determine a topic that each rotating participant will be discussing on the conference call and determine the order based on each of the topics.

16. The conference system of claim 15, further comprising:

the processing system configured to rank the topics based on importance and schedule rotating participants discussing more important topics earlier in the conference call than rotating participants discussing less important topics.

17. The conference system of claim 11, wherein the processing system configured to determine the order comprises:

the processing system configured to determine which of the rotating participants should not be connected to the conference call at the same time and determine the order based on the rotating participants that should not be connected to the conference call at the same time.

18. The conference system of claim 11, wherein the order further defines when a rotating participant should be speaking when connected to the call, and the conference system further comprising:

when more than one of the rotating participants are connected to the conference call at the same time, the processing system configured to selectively mute and unmute the rotating participants based on the order.

19. The conference system of claim 11, further comprising:

during the conference call, the processing system configured to update the order based on factors identified as the conference call progresses.

20. A computer readable storage medium having instructions stored thereon for operating a conference system to facilitate a conference call with rotating participants, the instructions, when executed by the conference system, direct the conference system to:

identify one or more static participants for the conference call;

identify at least two rotating participants for the conference call;

determine an order in which the rotating participants will be connected to the conference call;

connect the conference call to one or more static clients operated by the one or more static participants; and connect and disconnect the conference call to each of one or more rotating clients, operated by the rotating participants, in accordance with the order.

* * * * *